United States Patent
Richter

(10) Patent No.: US 9,998,976 B2
(45) Date of Patent: Jun. 12, 2018

(54) METHOD FOR OPERATING A MOBILE DEVICE AND APPARATUS FOR HANDING OVER A MOBILE DEVICE

(71) Applicant: Peiker Acustic GmbH & Co. KG, Friedrichsdorf (DE)

(72) Inventor: Lutz P. Richter, Mixdorf (DE)

(73) Assignee: Peiker Acustic GmbH & Co. KG, Friedrichsdorf (DE)

( * ) Notice: Subject to any disclaimer, the term of this patent is extended or adjusted under 35 U.S.C. 154(b) by 76 days.

(21) Appl. No.: 15/130,094

(22) Filed: Apr. 15, 2016

(65) Prior Publication Data
US 2016/0323796 A1 Nov. 3, 2016

(30) Foreign Application Priority Data
Apr. 30, 2015 (DE) .................... 10 2015 106 756

(51) Int. Cl.
*H04W 36/32* (2009.01)
*H04W 84/00* (2009.01)
*H04W 84/04* (2009.01)
*H04W 36/14* (2009.01)

(52) U.S. Cl.
CPC ............ *H04W 36/32* (2013.01); *H04W 36/14* (2013.01); *H04W 84/005* (2013.01); *H04W 84/045* (2013.01)

(58) Field of Classification Search
CPC ... H04W 36/04; H04W 36/32; H04W 84/045; H04W 84/005; H04W 36/14; H04W 36/18
See application file for complete search history.

(56) References Cited

U.S. PATENT DOCUMENTS

| 6,345,186 | B1* | 2/2002 | Schultz | H04W 36/24 |
| | | | | 455/436 |
| 2007/0155421 | A1* | 7/2007 | Alberth | H04B 7/18508 |
| | | | | 455/553.1 |
| 2011/0217947 | A1* | 9/2011 | Czaja | H04M 11/04 |
| | | | | 455/404.1 |
| 2013/0337872 | A1 | 12/2013 | Fertl et al. | |

(Continued)

FOREIGN PATENT DOCUMENTS

DE 10 2010 028 859 A1 11/2011
DE 10 2011 007 755 A1 10/2012

(Continued)

OTHER PUBLICATIONS

Extended European Search Report (Application No. 16165011.4) dated Sep. 28, 2016.

*Primary Examiner* — Charles C Jiang
*Assistant Examiner* — Kyaw Z Soe
(74) *Attorney, Agent, or Firm* — Burr & Brown, PLLC

(57) ABSTRACT

A method for operating a mobile device in a cabin of a vehicle as well as in an environment outside of the vehicle is provided. Additionally an apparatus for handing over a mobile device from one of a multiplicity of base stations of a mobile network to a communication system of a vehicle and for operating the mobile device in a cabin of the vehicle and for handing over the mobile device from the communication system of the vehicle to one of a multiplicity of base station of a mobile network is provided.

16 Claims, 4 Drawing Sheets

(56) References Cited

U.S. PATENT DOCUMENTS

| | | | | |
|---|---|---|---|---|
| 2014/0045491 A1* | 2/2014 | Van Phan | ........... | H04W 84/005 |
| | | | | 455/426.1 |
| 2014/0192781 A1* | 7/2014 | Teyeb | ................... | H04W 36/34 |
| | | | | 370/331 |
| 2014/0364119 A1* | 12/2014 | Bradley | ................ | H04W 36/24 |
| | | | | 455/436 |
| 2015/0372747 A1* | 12/2015 | Nilsson | ................ | H01Q 25/005 |
| | | | | 455/25 |
| 2017/0311216 A1* | 10/2017 | Mythri Hunukumbure | ...... | H04W 36/04 |

FOREIGN PATENT DOCUMENTS

| | | |
|---|---|---|
| DE | 10 2012 208 641 A1 | 11/2013 |
| EP | 1 138 164 A2 | 10/2001 |
| EP | 2 501 200 A1 | 9/2012 |
| EP | 2 830 356 A1 | 1/2015 |

* cited by examiner

METHOD FOR OPERATING A MOBILE DEVICE AND APPARATUS FOR HANDING OVER A MOBILE DEVICE

This application claims the benefit under 35 USC § 119(a)-(d) of German Application No. 10 2015 106 756.0 filed Apr. 30, 2015, the entirety of which is incorporated herein by reference.

FIELD OF THE INVENTION

The present invention relates to a method for operating a mobile device in a cabin of a vehicle as well as in an environment outside of the vehicle, an apparatus for handing over a mobile device from one of a multiplicity of base stations of a mobile network to a communication system of a vehicle, and for operating the mobile device in a cabin of the vehicle and for handing over the mobile device from the communication system of the vehicle to one of a multiplicity of base station of a mobile network.

BACKGROUND OF THE INVENTION

Small communication cells (radio cells), for example, femtocells or picocells, allow mobile-network providers to extend the network and to provide better coverage and higher data rates in a cost efficient manner. Such a small cell is an inexpensive base station due to low-power consumption and reduced signal strength. These cells utilize commercial cellular communication standards and common licensed transmission spectra. To a mobile station, for example, a mobile phone, a smart phone or tablet computer, a small cell appears indistinguishable from a traditional base station, as they all have the usual overhead channels, signalization and are capable of in-band handoffs.

By integrating a small cell into a vehicle, all 3G/4G/5G-equipped devices used inside the vehicle can be connected to a mobile-network without any detractions by the vehicle environment. Such detractions occur, for example, by the metallic frame of the vehicle and/or by thermally insulating films applied to the windows of the vehicle.

The architecture of an in-vehicle small cell is described in US 2007/0155421 A1, EP 2 501 200 A1, US 2011/0217947 A1 and DE 10 2012 208 641 A1, but these documents do not describe how to integrate a moving small cell to a mobile communications network in a seamless, stable manner without distortions.

DE 10 2010 028 859 A1 proposes a small cell management by using route guidance information. A similar approach is disclosed in DE 10 2011 007 755 A1.

In contrast to conventional and widely used small cells, which are connected to the backhaul of the network by wire, for example, via DSL, the in-vehicle small cell must be connected by a wireless backhaul link. In most significant cases, this link is established via the base station itself. Accounting for the movement of an in-vehicle small cell is not straightforward and requires additional mobility features that are currently not supported by a mobile-network architecture. For example, since a conventional small cell is installed at a fixed location, in order to enable a seamless handover (from base station to small cell or between small cells), the small cell must be part of the network configuration, such as location areas or a "neighborhood cell list".

Another issue is that, when the vehicle is moving the wireless backhaul link of an in-vehicle small cell can vary due to radio/data channel transmission conditions and areal coverage.

Yet another issue is that the in-vehicle small cell must work across country borders, which requires specific roaming and re-provisioning mechanisms for the desired services.

Seamless mobility between macro cells/base stations and an in-vehicle small cell, and good connectivity when the vehicle moves, are essential components for a good user experience. Both can be accomplished by a well configured in-vehicle small cell in combination with a in-vehicle WiFi-hot-spot only, according to the present invention (FIG. 1).

SUMMARY OF THE INVENTION

To enable seamless communication and connectivity for a mobile device to a mobile network when using a vehicle which may be, for example, a bus, train or car, the vehicle must provide an installed communications system containing a femtocell and a WiFi-hot-spot, both connected to the mobile network via one dedicated network access device as a part of the communications system.

When the vehicle is stopped, for example, parked, the in-vehicle femtocell will be connected to the backhaul elements, including a femtocell gateway, via a dedicated base station (macro cell) of the mobile network. The network will provide neighborhood cell information with parameters of the in-vehicle femtocell included to all mobile devices, connected to the mobile network via this specific base station.

When a user enters the vehicle with an active mobile device, the mobile device is performing a handover procedure to the in-vehicle femtocell. The in-vehicle WiFi-hot-spot is activated at all given time and connected to and controlled by the mobile network via the same network access device as it is used for the connection of the femtocell to the mobile network. When positioned inside the vehicle, the in-vehicle communication system will initiate a seamless handover of the mobile device from the femtocell component to the hot-spot component. This handover is done either in the case the vehicle starts moving or at any time before the vehicle starts moving, and especially immediately after the connection to the femtocell has been established.

When the moving vehicle cannot be a part of a neighborhood cell list of a mobile network anymore, the connection to the backhaul/femtocell gateway is terminated. But a seamless connection and communication of a mobile device in a vehicle to the mobile network is still available via the hot-spot functionality. A handover and roaming of the in-vehicle communication system between different macro cells/base stations and mobile networks is done efficiently based on active and state of the art procedures. That is, due to the hot-spot connectivity, the mobile device is connected and communicating without restrictions.

When the vehicle stops, the relevant neighborhood cell information is gathered and transferred to the mobile device by the in-vehicle communication system. Therefore, a seamless handover to a dedicated macro cell or another femtocell in the area where the vehicle comes to a stop is done by the mobile device without any interferences when the user exits the vehicle.

According to the present invention, a vehicle is any land craft especially a road vehicle, a rail vehicle, or an off-road vehicle.

According to the present invention, a "seamless handover" is a handover of a wireless connection which is performed without any data loss.

BRIEF DESCRIPTION OF THE DRAWINGS

The invention will be described using the following non-limiting embodiments of apparatuses and methods by way of example.

DETAILED DESCRIPTION OF THE INVENTION

Figure 1:
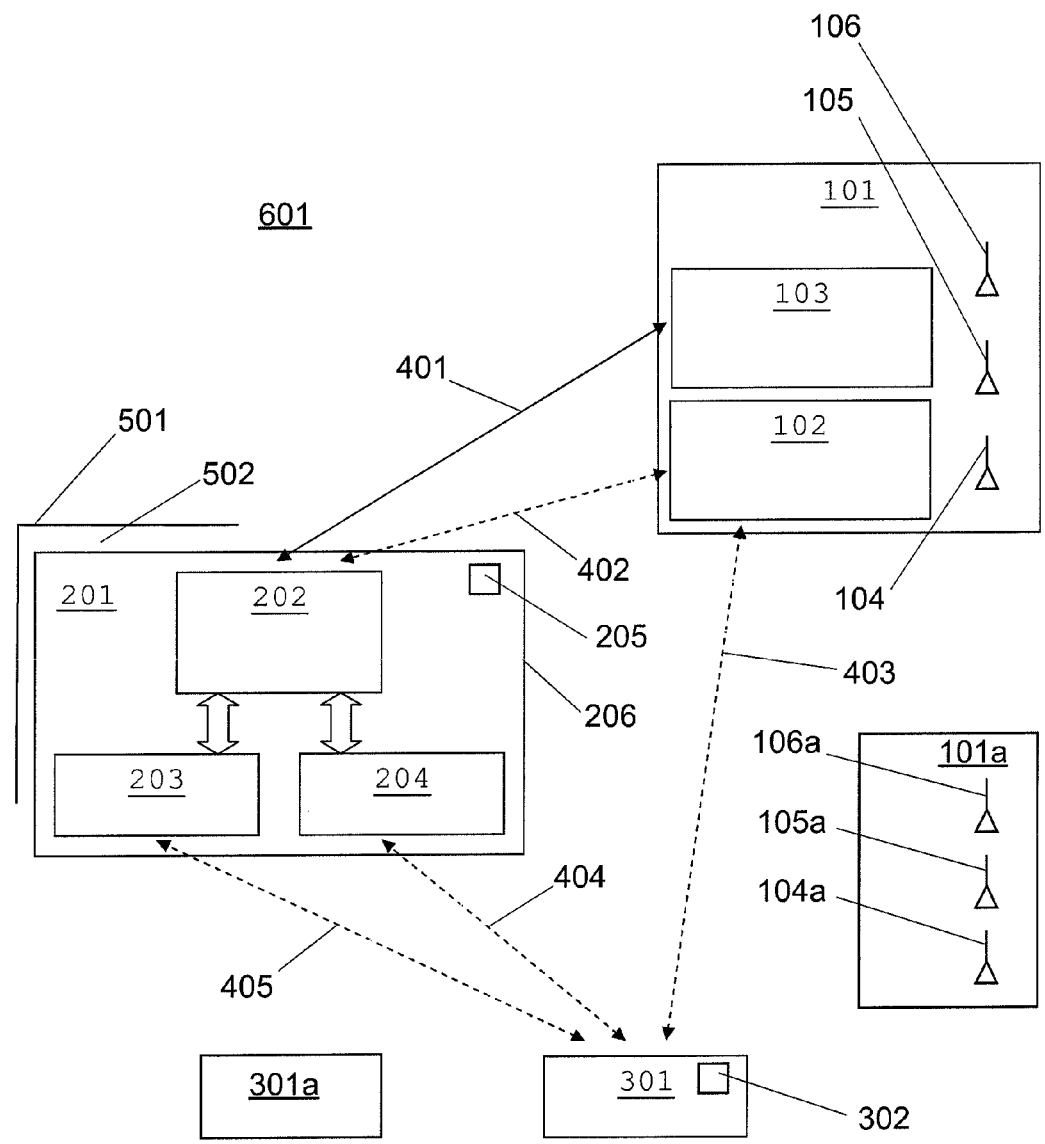
FIG. 1 shows the architecture of a communication system of a vehicle and its interaction with a mobile phone and a mobile network.
Figure 2:
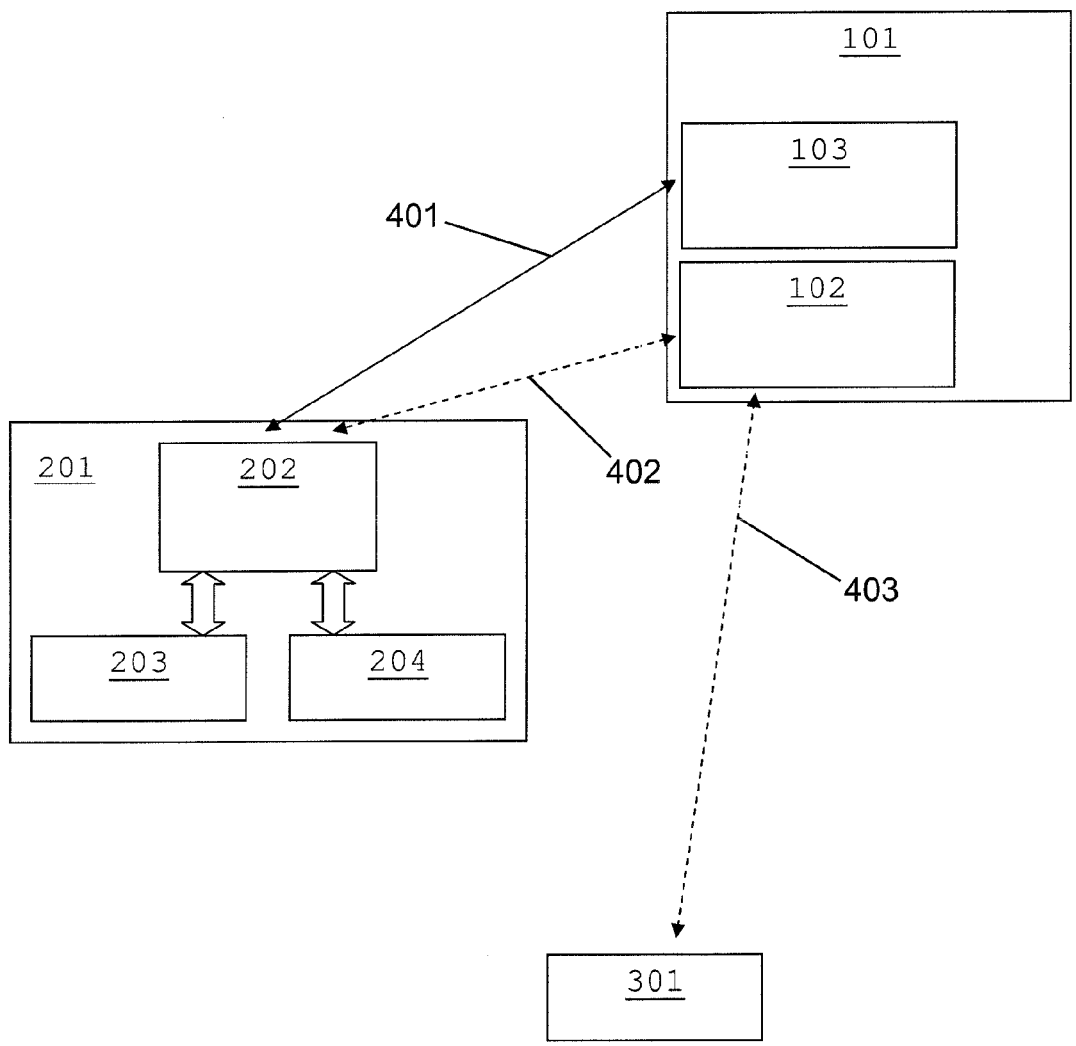
FIG. 2 shows the architecture of the communication system shown in FIG. 1, wherein the mobile device is connected via a communication link to the mobile network.
Figure 3:
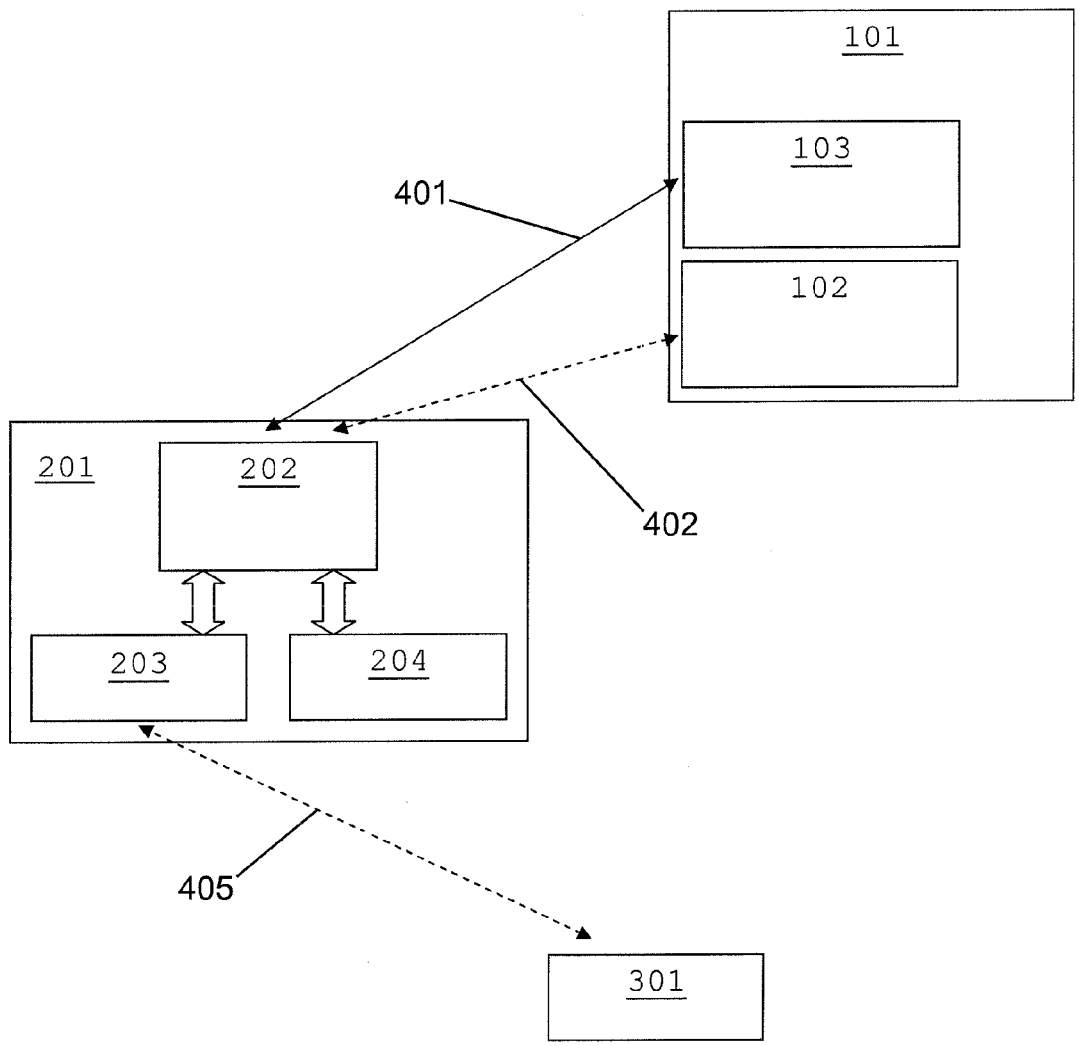
FIG. 3 shows the architecture of the communication system shown in FIG. 1, wherein the mobile device is connected via a communication link to the femtocell.
Figure 4:
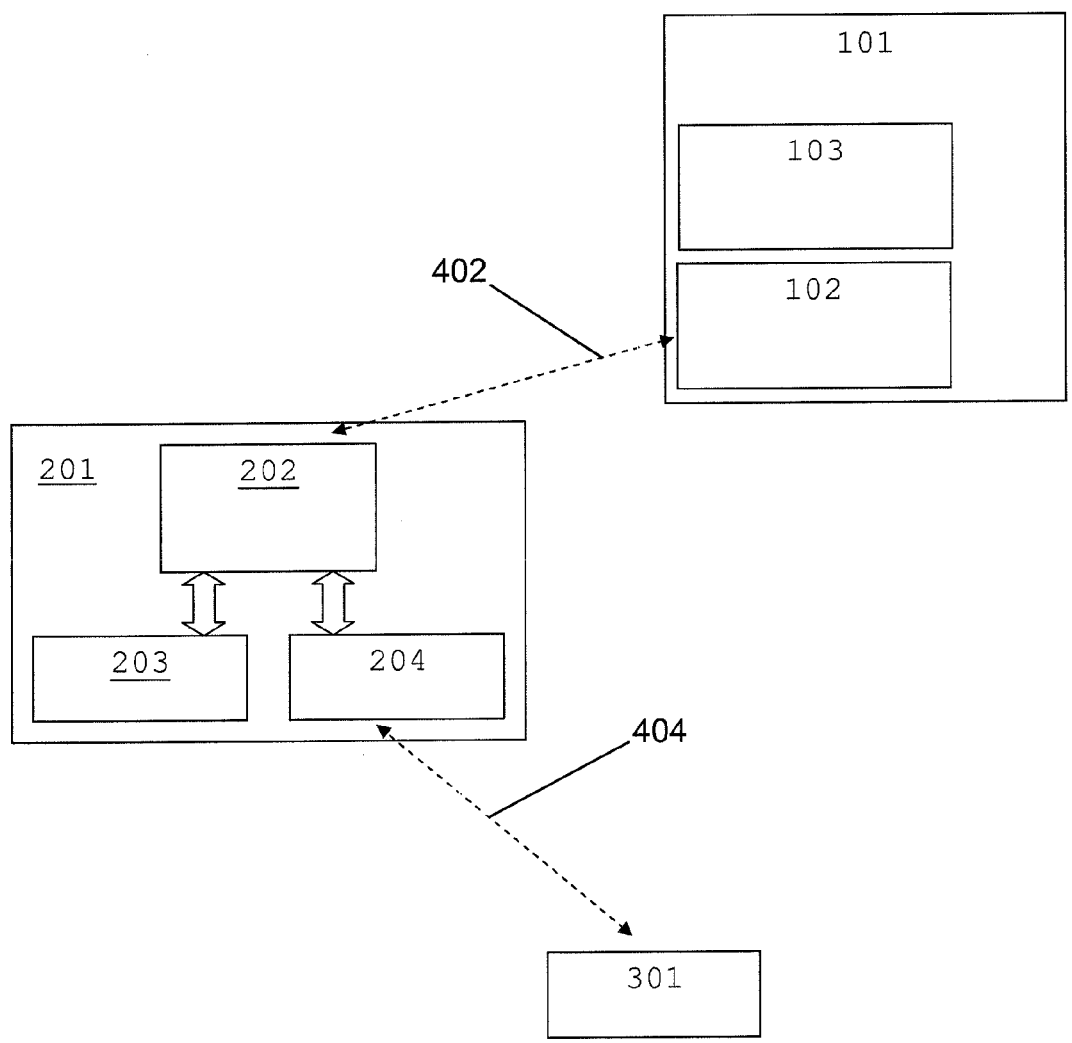
FIG. 4 shows the architecture of the communication system shown in FIG. 1, wherein the mobile device is connected via a communication link to the WiFi-hot-spot.

FIG. 1 describes the interaction of all relevant components. A network access device 202, which is located in a cabin 502 of a vehicle 501 connects the in vehicle small cell (e.g., femtocell) 203 and the WiFi Hot-Spot 204 to a mobile network 101 via different elements of the mobile network 101, especially via service elements 102 and via backhaul elements 103 and specific communication links 401, 402. A mobile device 301 is able to use all components, namely, the small cell 203 or the WiFi-Hot-Spot 204 or a base station 104, 105 or 106 of the mobile network 101 itself for being connected to the mobile network 101. The mobile device 301 establishes a communication link 403 to the mobile network 101 as long as the mobile device 301 is located in an environment 601 outside the cabin 502 of the vehicle 501. Inside the cabin 502 of the vehicle 501 the mobile device 301 establishes a communication link 405 to the small cell 203 or establishes a communication link 404 to the WiFi-hot-spot 204. A communication system 201 of the vehicle 501 comprises the network access device 202 and the in vehicle small cell 203 and the WiFi Hot-Spot 204. Optionally the communication system 201 comprises a control unit 205 that detects or predicts the state of movement of the vehicle 501 in order to initiate the collecting of neighborhood cell information of available mobile networks 101 101a. An apparatus 206 for handing over the mobile device 301, 301a from one of a multiplicity of base stations 104, 105, 106, 104a, 105a, 106a of the mobile network 101 to the small cell 203 or to the WiFi-hot-spot 204 or for handing over the mobile device 301 from the small cell 203 or to the WiFi-hot-spot 204 to one of a multiplicity of base station 104, 105, 106 104a, 105a, 106a of the mobile network 101 is provided. Additionally, or alternatively, the mobile network 101a comprises the communication system 201 wherein the control unit 205 is an optional part of the communication system 201. In another embodiment, a control unit 302 is part of the mobile device 301 and not part of the communication system 201. In this case, the control unit 302 comprises a gyroscope or other means in order to detect the state of movement of the vehicle and request neighborhood cell information from the communication system 201 in the case that a stop of the vehicle 501 is detected or predicted. FIG. 1 shows the communication system architecture with all possible communication links 401 to 405. FIGS. 2 to 4 show, with respect to the mobile device 301, special communication situations.

In FIG. 2 the mobile device 301 is connected and communicates with the mobile network 101 directly via the communication link 403. The mobile device 301 will receive neighborhood cell information with the in-vehicle small cell 203 parameters included. If the vehicle 501 is parking this means the existence of a standstill condition and the communication system 201 of the vehicle 501 is connected to the mobile network 101 via the communication links 401, 402, which include the network's backhaul elements 103, especially the femtocell gateway.

When the mobile device 301 receives the vehicle it will do a handover to the in-vehicle small cell 203, controlled by the network management, without losing a connection to the mobile network 101 itself.

FIG. 3 shows this communication situation with the communication link 405 between the mobile device 301 and the small cell 203.

In the case that the vehicle 501 is moving the communication system 201 of the vehicle 501 will not be connected to the backhaul elements 103 of the mobile network 101 anymore. In this case the mobile device 301 is using the in-vehicle WiFi-hot-spot 204 for communication via the communication link 404. The transfer of the mobile devices 301 connectivity and communication from the in-vehicle small cell 203 to the in-vehicle WiFi-hot-spot is done seamlessly and controlled by the in-vehicle communication system 201. FIG. 4 shows this communication situation with the communication link 404 between the mobile device 301 and the WiFi-hot-spot 204. During movement of the vehicle, 501 the communication system 201 is connected via the communication link 402 to the service elements 102 of the mobile network 101 for enabling communication and connectivity for the mobile device 301.

LIST OF REFERENCES

101 Mobile Network Macrocell/Base Station (3G/4G-Network)
101a Mobile Network
102 Network Element to provide communication services to mobile devices (3G/4G-Network Service Elements)
103 Network Element to provide a backhaul link to the small cell gateway (3G/4G-Network Backhaul Elements)
104, 105, 106 Base Station of 101
104a, 105a, 106a Base Station of 101a
201 In-Vehicle Communications System
202 Automotive Grade Network Access Device (3G/4G)
203 In-Vehicle Small Cell (Femtocell)
204 In-vehicle WiFi-Hot Spot
205 Control Unit
206 Apparatus
301 Mobile Device (Mobile Phone/Smart Phone/Tablet Computer)
301a Mobile Device
302 Control Unit
401 Small Cell Communication Link to the Network Backhaul
402 Network Access Device Communication Link for Hotspot Functionality
403, 404, 405 Mobile Device Communication Link
501 vehicle
502 cabin of 501
601 environment

The invention claimed is:

1. A method for operating a mobile device in a cabin of a vehicle as well as in an environment outside of the vehicle, wherein the environment comprises a mobile network with a multiplicity of base stations,
   wherein the vehicle comprises a communication system, comprising a network access device and both a femtocell and WiFi-hot-spot respectively connected to the network access device, wherein the network access device is connected to one of the base stations of the mobile network and wherein the method comprises, on different occurrences, the steps:

when moving the mobile device from the environment into the cabin of the vehicle a seamless handover of the mobile device from one of the base stations of the mobile network to the femtocell is performed, wherein once a connection of the mobile device to the femtocell is established, the mobile device is connected only to the femtocell by the communication system, such that this connection is kept alive as long as the mobile device remains in the vehicle and as long as the vehicle is in standstill condition, when a movement of the vehicle is detected a seamless handover of the mobile device from the femtocell to the WiFi-hot-spot is performed, wherein once the seamless handover of the mobile device from the femtocell to the WiFi-hot-spot is established, the mobile device is connected only to the WiFi-hot-spot by the communication system as long as the movement of the vehicle is detected, and when moving the mobile device from the cabin of the vehicle to the environment a seamless handover of the mobile device to one of a multiplicity of base stations of a mobile network is performed.

2. A method for operating a mobile device according to claim 1, wherein a neighborhood cell list is collected by the network access device and is transmitted in a first step to the femtocell each time a standstill of the vehicle is detected or each time a standstill of the vehicle is predicted by a control unit of the vehicle and/or by a control unit of the mobile device.

3. A method for operating a mobile device according to claim 2, wherein in a second step the neighborhood cell list is provided to each mobile device which is logged in the femtocell.

4. A method for operating a mobile device according to claim 1, wherein each time a standstill of the vehicle is detected or each time a standstill of the vehicle is predicted by a control unit of the vehicle and/or by a control unit of the mobile device, the standstill is classified by the control unit as a deboarding-standstill, which is suitable for passengers to leave the vehicle, or as a traffic-caused-standstill, which is not suitable for passengers to leave the vehicle.

5. A method for operating a mobile device according to claim 1, wherein when a standstill of the vehicle is detected, a seamless handover of the mobile device from the WiFi-hot-spot to the femtocell is performed.

6. A method for operating a mobile device according to claim 4, wherein when a deboarding-standstill of the vehicle is detected, a seamless handover of the mobile device from the WiFi-hot-spot to the femtocell is performed.

7. A method for operating a mobile device according to claim 1, using the femtocell functionality when the vehicle is in standstill conditions only, executing all necessary procedures of being connected to the backhaul components and femtocell gateway of the mobile network for being part of a neighborhood cell list, transmitted by the mobile network via a dedicated base station available in the area where the vehicle is standing.

8. A method for operating a mobile device according to claim 1, using the WiFi-hot-spot functionality when the vehicle is moving to allow all mobile devices, used inside the vehicle, for being connected to and communicating with the mobile network.

9. A method for operating a mobile device according to claim 1, wherein the mobile device is provided with neighborhood cell information of the mobile network, which includes parameters of the femtocell before the vehicle is entered.

10. A method for operating a mobile device according to claim 9, wherein the cell information of the mobile network, which includes parameters of the femtocell, is emitted by the mobile network and/or is emitted by the WiFi-hot-spot of the vehicle.

11. An apparatus for handing over a mobile device from one of a multiplicity of base stations of a mobile network to a communication system of a vehicle, and for operating the mobile device in a cabin of the vehicle and for handing over the mobile device from the communication system of the vehicle to one of a multiplicity of base stations of a mobile network, wherein the communication system of the vehicle comprises a network access device and both a femtocell and a WiFi-hot-spot respectively connected to the network access device, wherein the network access device is connected to one of a multiplicity of base stations of a mobile network and wherein the apparatus performs a seamless handover of the mobile device from the base stations of the mobile network to the femtocell during the movement of the mobile device from the environment into the cabin of the vehicle, wherein once a connection of the mobile device to the femtocell is established by the apparatus, the mobile device is connected only to the femtocell by the communication system, such that the apparatus keeps this connection to the femtocell alive as long as the mobile device remains in the vehicle and as long as the vehicle is in standstill condition, wherein the apparatus performs a seamless handover of the mobile device from the femtocell to the WiFi-hot-spot when a movement of the vehicle is detected, wherein once the seamless handover of the mobile device from the femtocell to the WiFi-hot-spot is established by the apparatus, the mobile device is connected only to the WiFi-hot-spot by the communication system as long as the movement of the vehicle is detected, and wherein the apparatus performs a seamless handover of the mobile device from the communication system to one of a multiplicity of base stations of a mobile network when the mobile device is leaving the vehicle.

12. An apparatus of claim 11, wherein the network access device collects a neighborhood cell list and transmits the neighborhood cell list in a first step to the femtocell each time a control unit of the apparatus detects a standstill of the vehicle or each time the control unit of the apparatus predicts a standstill of the vehicle.

13. An apparatus of claim 12, wherein in a second step the femtocell provides the neighborhood cell list to each mobile device which is logged in.

14. An apparatus of claim 11, wherein each time a control unit of the apparatus detects a standstill of the vehicle or each time the control unit of the apparatus predicts a standstill of the vehicle, the control unit classifies the standstill as a deboarding-standstill, which is suitable for passengers to leave the vehicle, or as a traffic-caused-standstill, which is not suitable for passengers to leave the vehicle.

15. An apparatus of claim 11, wherein when a control unit of the apparatus detects a standstill of the vehicle, the apparatus performs a seamless handover of the mobile device from the WiFi-hot-spot to the femtocell.

16. An apparatus of claim 14, wherein when the control unit detects a deboarding-standstill of the vehicle, the apparatus performs a seamless handover of the mobile device from the WiFi-hot-spot to the femtocell.

\* \* \* \* \*